(12) United States Patent
Kitou

(10) Patent No.: US 7,463,434 B2
(45) Date of Patent: Dec. 9, 2008

(54) LENS FOR A LIGHTING FIXTURE

(75) Inventor: Yoshimasa Kitou, Toyota (JP)

(73) Assignee: Kojima Press Industry Co., Ltd., Toyota-shi (JP)

( * ) Notice: Subject to any disclaimer, the term of this patent is extended or adjusted under 35 U.S.C. 154(b) by 0 days.

(21) Appl. No.: 11/739,632

(22) Filed: Apr. 24, 2007

(65) Prior Publication Data
US 2008/0084610 A1    Apr. 10, 2008

(30) Foreign Application Priority Data
Oct. 6, 2006    (JP) ............................. 2006-275461

(51) Int. Cl.
G02B 7/02    (2006.01)
F21V 5/00    (2006.01)

(52) U.S. Cl. ...................... 359/811; 362/326

(58) Field of Classification Search ......... 359/811–819; 362/74, 368, 135–142, 326, 332, 337, 355
See application file for complete search history.

(56) References Cited

U.S. PATENT DOCUMENTS

| 4,443,831 A * | 4/1984 | Godfrey et al. ............. 362/494 |
| 4,479,172 A * | 10/1984 | Connor ........................ 362/492 |
| 4,807,096 A | 2/1989 | Skogler et al. |
| 6,095,665 A * | 8/2000 | Drake et al. ................. 362/276 |
| 2002/0041496 A1 | 4/2002 | Hatagishi et al. |
| 2006/0132934 A1 * | 6/2006 | Hille ........................... 359/811 |

OTHER PUBLICATIONS

European Search Report dated Jul. 27, 2007, for corresponding European Patent Application No. 07008332.4.

* cited by examiner

Primary Examiner—Mohammed Hasan
(74) Attorney, Agent, or Firm—Christie, Parker & Hale, LLP

(57) ABSTRACT

A lens for a lighting fixture equipped with an engaging portion that engages with a counter member. The counter member or the engaging portion has an engaging pawl that engages with the other member. The back surface of the lens is formed with a surface relief to diffuse light, the engaging portion is arranged on the back surface of the lens, and an intermediate surface relief is disposed between the back surface of the lens and a top end surface of the engaging portion.

11 Claims, 3 Drawing Sheets

RELATED ART | EMBODIMENT OF THE INVENTION

LENS FOR A LIGHTING FIXTURE

CROSS-REFERENCE TO RELATED APPLICATION

This application claims priority of Japanese Patent Application Number 2006-275461, filed on Oct. 6, 2006.

BACKGROUND OF THE INVENTION

1. Field of the Invention

This invention relates to a lens for a lighting fixture, and particularly, to a lens for a lighting fixture used, for example, for an overhead dome light for vehicles.

2. Description of the Related Art

A lens for a lighting fixture used for an overhead dome light for vehicles, has an engaging portion 12 (FIG. 7) with an engaging pawl 13 so as to be firmly fixed to a panel 15 when it is fitted thereto. The lens, further, has a plurality of pyramids formed on the back surface 11 thereof as shown in FIG. 6 on an enlarged scale so as to diffuse light creating an aesthetic feeling when the lighting fixture is seen by passengers. Further, a rib 2 is formed surrounding the back surface 11 of the lens. A top end surface 7 of the rib 2 is formed with a surface relief as illustrated in FIG. 7 on an enlarged scale so as to produce an aesthetic feeling by diffusing light like the above pyramids. A top end surface 14 of the engaging portion 12, also has a surface relief substantially parallel with the top end surface 7 of the rib 2.

When the vicinity of the engaging portion 12 is seen from a direction substantially perpendicular to the surface of the lens as represented by position α in FIG. 8, the surface relief appears to have continuity and beauty. When seen aslant as represented by position β, however, the surface relief appears irregular as represented by viewing line X which mars the appearance.

SUMMARY OF THE INVENTION

In view of the above problem, it is an object of the present invention to provide a lens for lighting which enables the surface relief to be seen as continuously as possible even near the portion where the lens is engaged.

According to the invention, there is provided a lens for a lighting fixture equipped with an engaging portion that engages with a counter member, wherein the counter member or the engaging portion has an engaging pawl that engages with the other member, the back surface of the lens is formed with a surface relief to diffuse light, the engaging portion is arranged on the back surface of the lens, and an intermediate surface relief is disposed between the back surface of the lens and top end surface of the engaging portion. Owing to the provision of the intermediate surface that is formed with a surface relief, the surface appears continuously even when the vicinity of the engaging portion is seen aslant as described above.

BRIEF DESCRIPTION OF THE DRAWINGS

The present invention will be more clearly understood from the description as set below with reference to the accompanying drawings, wherein.

DESCRIPTION OF THE PREFERRED EMBODIMENTS

Figure 1:
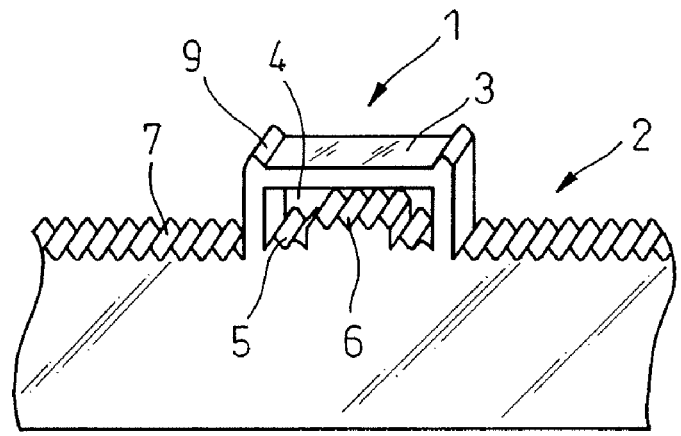
FIG. 1 is a perspective view illustrating, on an enlarged scale, an engaging portion of a lens according to an embodiment of the invention.
Figure 6:
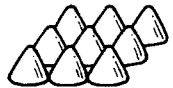
FIG. 6 is a view of an enlarged image of pyramid protrusions arranged on the back surface of the lens of FIG. 4.
Figure 7:
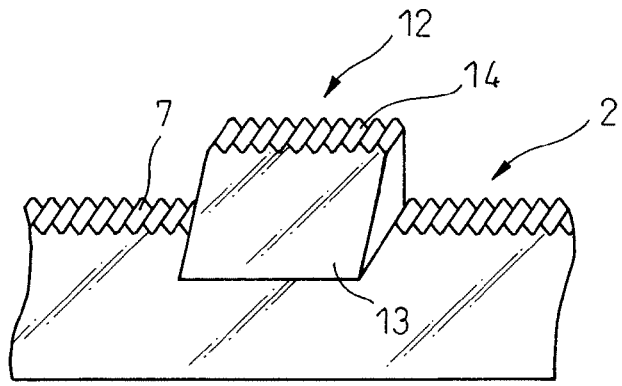
FIG. 7 is a perspective view illustrating an engaging portion of a conventional lens on an enlarged scale.

FIG. 1 is a view illustrating, on an enlarged scale, an engaging portion 1 according to an embodiment of the invention provided for a rib 2 like the engaging portion 12 of the conventional lens of FIG. 7. As shown in FIGS. 1-4, the side surface has a through hole 4 formed therein to engage with an engaging pawl 8 provided on the side of a panel 15. The inner wall surface 5 of the through hole 4 on the lens side, substantially parallel with the top end surface 7 of rib 2, is formed with a surface relief like the surface of rib 2, or is formed like the back surface of the lens as shown in FIG. 6. More desirably, the inner wall surface 5 has a partly protruding portion 6 which works to position and hold the engaging pawl 8 when it is engaged.

Figure 2:
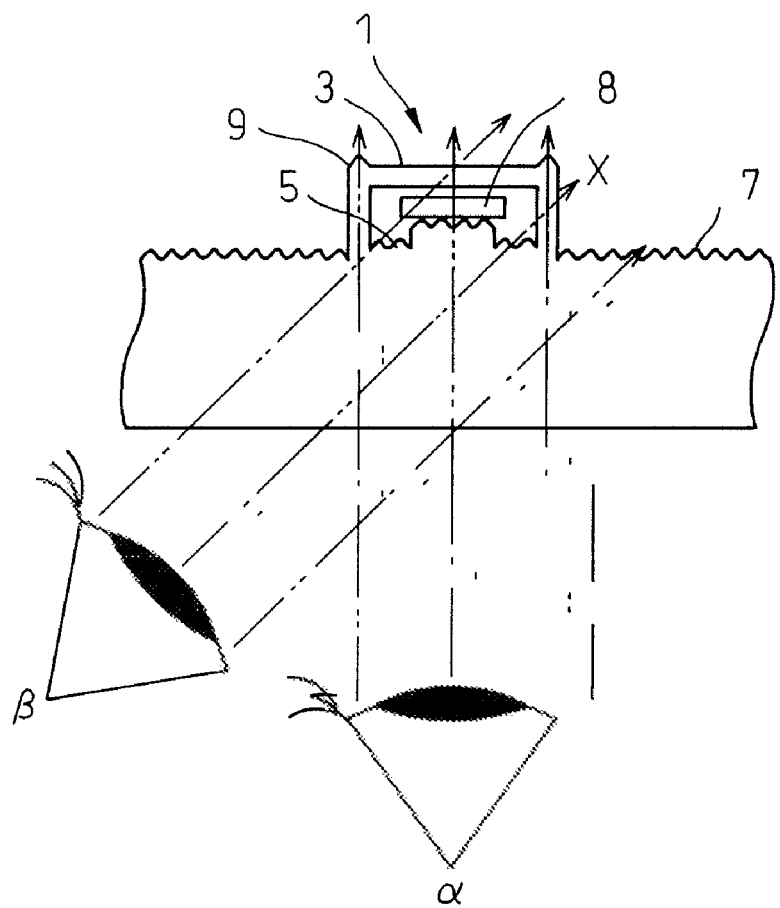
FIG. 2 is a view illustrating a state where the lens is seen according to the embodiment of the invention.
Figure 3:
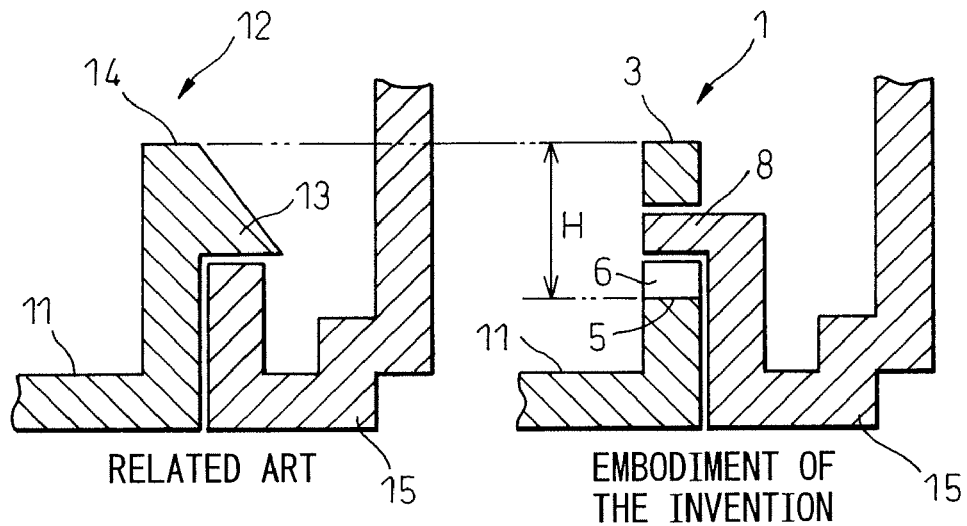
FIG. 3 is a sectional view showing the engaging state of an engaging portion of a conventional lens in comparison with the engaging state of an engaging pawl of an engaging portion of the lens according to the embodiment of the invention.
Figure 4:
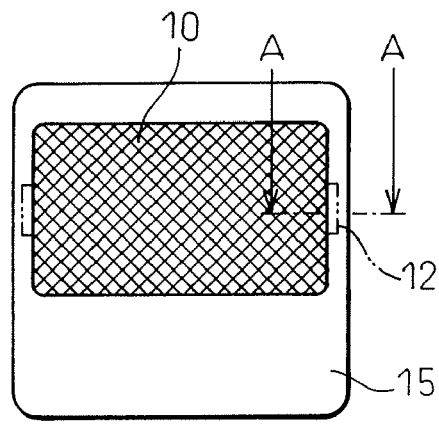
FIG. 4 is a view illustrating a state where a general lens is fitted into a panel.
Figure 5:
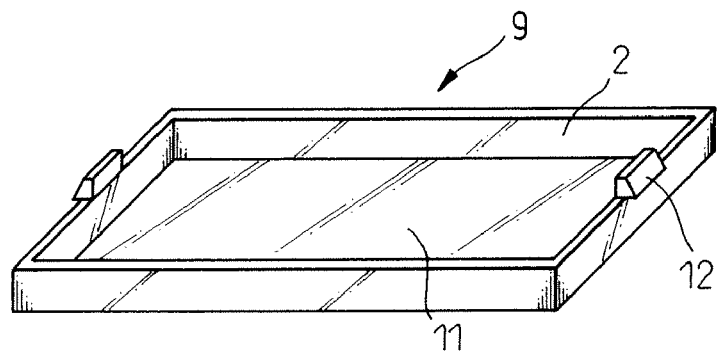
FIG. 5 is a perspective view of the lens of FIG. 4.
Figure 8:
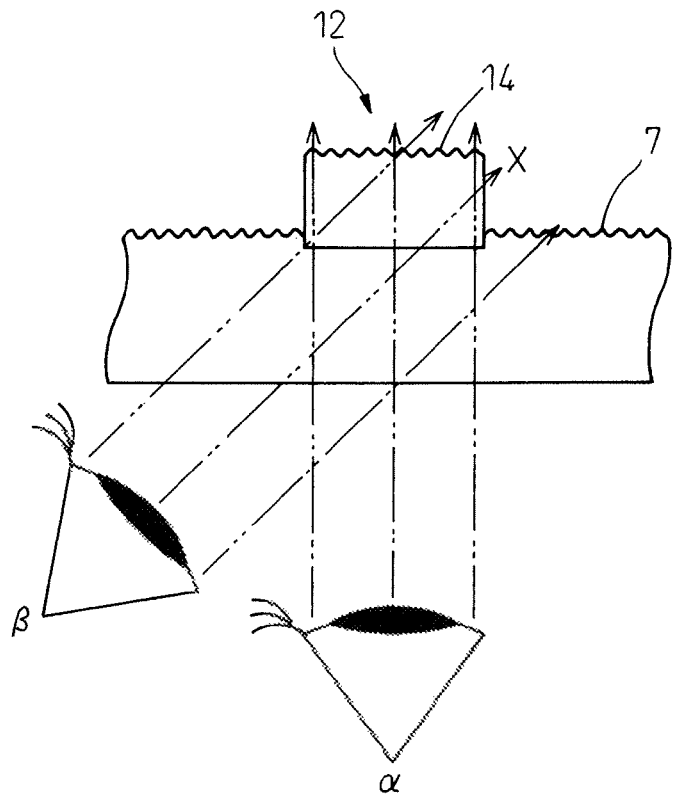
FIG. 8 is a view of a state where the conventional lens is seen.

The distance between a plane inclusive of the inner wall surface 5 and a plane inclusive of the top end surface 7 of the rib 2 in FIG. 2 is shorter than the distance between a plane inclusive of the top end surface 14 of the engaging portion 12 and a plane inclusive of the top end surface 7 of the rib 2 in FIG. 8, which is a conventional structure. If the engagement of the engaging portion of the conventional lens is compared with the engagement with the engaging pawl of the engaging portion of the lens of the invention as shown in the cross section in FIG. 3 cut along the line A-A in FIG. 4, the distance is shortened by a height H. Viewed from the cutaway portion, the conventional structure has a cut in the surface relief as indicated by viewing line X in FIG. 8, whereas the structure of the invention exhibits a surface relief continuously without almost any cut as represented by viewing line X at position β in FIG. 2.

More desirably, the portions of the top end surface 3 of the engaging portion 1 which are substantially parallel with the top end surface 7 of rib 2, also have a surface relief as designated in 9 in FIGS. 1 and 2. Therefore, the surface relief is viewed from the cutaway portion, substantially continuously even when the vicinity of the engaging portion 1 is viewed from a direction substantially perpendicular to the lens surface as represented by position α or is viewed from position β in FIG. 2. The surface relief 9 may be formed over the whole top end surface 3 of the engaging portion 1. The appearance can be further improved if the thickness of the engaging portion 1 is selected to be substantially the same as the length of a pyramid protrusion on the back surface 11 of the lens in the direction of thickness thereof. The pyramid protrusion on the back surface 11 of the lens may be replaced by any other surface relief, as a matter of course.

In the above embodiment, the inner wall of the through hole 4 on the lens side is formed with a surface relief. The object of the invention, however, is also accomplished if a surface relief substantially parallel with the top end surface of the rib 4 is provided midway between the top end surface of the rib and the top end surface of the engaging portion. Such an intermediate surface may be formed by engraving the side surface of the engaging portion 1. In the above embodiment, the engaging pawl 8 of the panel 15 is engaged with the engaging portion 1 of the lens. The structure of engagement, however, may be reversed in the case of the above-mentioned intermediate surface. That is, the engaging portion 1 may have an engaging pawl that protrudes sideways from the top end surface 3 in addition to having an intermediate surface, while the panel may have a hole that engages with the engaging pawl. In the above embodiment, the top end surface of the rib, the top end surface of the engaging portion and the inner wall surface or the intermediate surface are all substantially parallel with each other. However, one or more of them may not be substantially parallel with the others. In the above embodiment, further, the rib is formed on the back surface of the lens, and the engaging portion is formed on the rib. However, the engaging portion may be directly formed on the back surface of the lens without the rib.

While the invention has been described with reference to specific embodiments chosen for purposes of illustration, it should be apparent that numerous modifications could be made thereto by those skilled in the art without departing from the basic concept and scope of the invention.

What is claimed is:

1. A lens for a lighting fixture having a back surface and a front surface for optically transmitting light from the back surface through the front surface, the lens comprising:
   an engaging portion arranged on the back surface of the lens, the engaging portion having a through hole formed between a top surface of the engaging surface and the back surface of the lens for engaging with a counter member, wherein the back surface of the lens is formed with a surface relief to diffuse light; and
   an intermediate surface relief disposed in the through hole between the back surface of the lens and a top end surface of the engaging portion opposite to the back surface of the lens, wherein the intermediate surface relief is configured to optically transmit light from the top end surface of the engaging portion through the front surface of the lens.

2. The lens for a lighting fixture according to claim 1, wherein at least portions of the top end surface of the engaging portion are formed with a surface relief.

3. The lens for a lighting fixture according to claim 1, wherein the intermediate surface relief is substantially parallel with the back surface of the lens.

4. The lens for a lighting fixture according to claim 2, wherein the intermediate surface relief is substantially parallel with the back surface of the lens.

5. The lens for a lighting fixture according to claim 1, wherein a thickness of the engaging portion is set to be substantially equal to a unit length of the surface relief on the back surface of the lens in the direction of thickness thereof.

6. The lens for a lighting fixture according to claim 2, wherein a thickness of the engaging portion is set to be substantially equal to a unit length of the surface relief on the back surface of the lens in the direction of thickness thereof.

7. The lens for a lighting fixture according to claim 3, wherein a thickness of the engaging portion is set to be substantially equal to a unit length of the surface relief on the back surface of the lens in the direction of thickness thereof.

8. The lens for a lighting fixture according to claim 4, wherein a thickness of the engaging portion is set to be substantially equal to a unit length of the surface relief on the back surface of the lens in the direction of thickness thereof.

9. A lens for a lighting fixture comprising:
   an engaging portion for engaging with a counter member, wherein the counter member or the engaging portion has an engaging pawl that engages with the other member, the back surface of the lens is formed with a surface relief to diffuse light, the engaging portion is arranged on the back surface of the lens; and
   an intermediate surface relief disposed between the back surface of the lens and a top end surface of the engaging portion, wherein a thickness of the engaging portion is set to be substantially equal to a unit length of the surface relief on the back surface of the lens in the direction of thickness thereof.

10. The lens for a lighting fixture according to claim 9, wherein at least portions of the top end surface of the engaging portion are formed with a surface relief.

11. The lens for a lighting fixture according to claim 9, wherein the intermediate surface is substantially parallel with the back surface of the lens.

\* \* \* \* \*